United States Patent [19]

Johansson et al.

[11] Patent Number: 4,823,526

[45] Date of Patent: Apr. 25, 1989

[54] FRAME CONSTRUCTION PROVIDING LEAD THROUGH FACILITIES FOR CABLES OR LIKE DEVICES

[75] Inventors: Bengt-Göran Johansson, Lyckeby; Tomas Kreutz, Karlskrona; Bengt Olausson, Nättraby, all of Sweden

[73] Assignee: Lycab AB, Karlskrona, Sweden

[21] Appl. No.: 119,378

[22] Filed: Nov. 12, 1987

[30] Foreign Application Priority Data

Nov. 11, 1986 [SE] Sweden .................................. 8604818

[51] Int. Cl.⁴ .............................................. E04C 1/39
[52] U.S. Cl. ..................................................... 52/220
[58] Field of Search .................................. 52/220, 221

[56] References Cited

U.S. PATENT DOCUMENTS

| | | | |
|---|---|---|---|
| 1,910,160 | 5/1933 | Gorman | 52/665 |
| 2,592,634 | 4/1952 | Wilson | 52/220 |
| 2,981,386 | 4/1961 | Reske | 52/665 |
| 3,013,644 | 12/1961 | Smith | 52/665 |
| 3,628,299 | 12/1971 | Nakazawa | 52/665 |
| 4,008,553 | 2/1977 | Oliver | 52/665 |
| 4,190,996 | 3/1980 | Schindler | 52/656 |

FOREIGN PATENT DOCUMENTS 27448 3/1933 Netherlands ......................... 52/665

Primary Examiner—John E. Murtagh
Attorney, Agent, or Firm—Cushman, Darby & Cushman

[57] ABSTRACT

A frame structure for providing a lead-through facility for passing cables or like devices sealingly through a wall or like structure. The frame construction is substantially of rectangular configuration and is intended to be filled with packing pieces made of a material which has a given compressibility, in a manner to present through-passing holes which correspond in size and in number to the size and the number of cables or like devices to be passed through the frame construction. The frame construction includes a plurality of mutually interconnected frame member, namely at least one frame side-piece for each side of the frame, and one corner piece for each corner. The frame construction also includes partition walls which divide the interior of the frame construction into sections substantially perpendicularly to the frame side-pieces in the case of frame sides which are made-up of more than one frame side-piece. The partition walls have the same length as those frame side-pieces that extend parallel therewith. A connector device is provided for connecting mutually adjacent and/or intersecting partition walls one to the other.

10 Claims, 3 Drawing Sheets

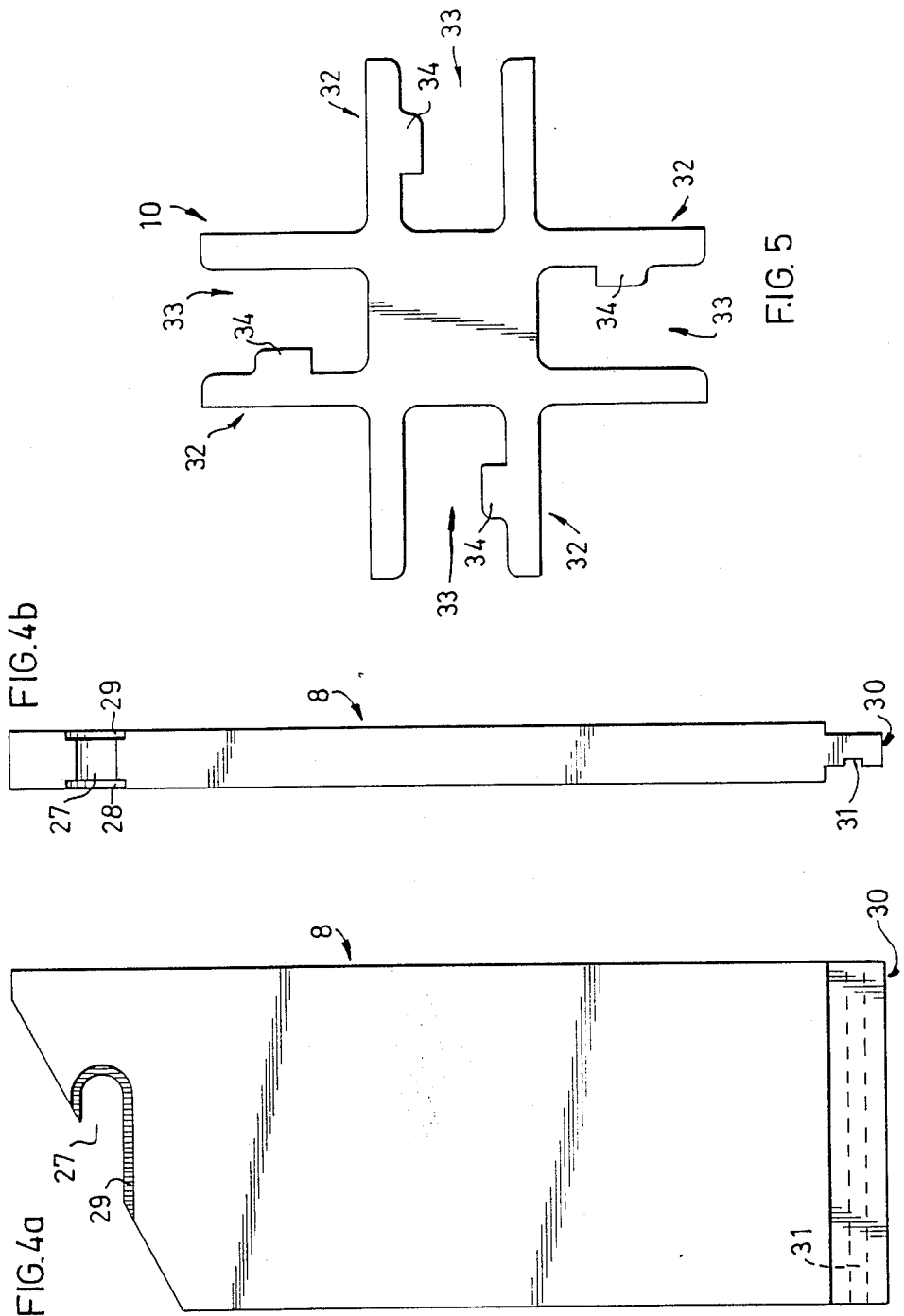

FRAME CONSTRUCTION PROVIDING LEAD THROUGH FACILITIES FOR CABLES OR LIKE DEVICES

BACKGROUND OF THE INVENTION

The present invention relates to a frame construction which provides leadthrough facilities for passing cables or like devices sealingly through a wall or like structure, said frame construction being essentially of rectangular configuration and being intended to be filled with packing pieces having a given compressibility, such as to present through-passing holes, the sizes and numbers of which holes correspond to the sizes and numbers of cables or like devices to be passed through the frame construction.

With known leadthrough facilities of this kind, the frame constructions used are normally made of steel or some other metal material, and the frames are constructed on site, e.g. welded together, and are delivered from the factory in a state ready for mounting in a wall or like structure. The frame construction is then connected to the wall, e.g. by cementing the frame construction in a concrete wall or by welding the frame construction in position in the case of a metal wall. Since the known frame constructions are delivered as completed units, the manufacturer is constantly required to hold a large number of different types of frames and different frame sizes in stock, in order to satisfy requirements. Alternatively, the manufacturer must manufacture the frames to suit each order received, which will naturally increase delivery time. Since the frame constructions are relatively bulky, the known frame constructions have the added disadvantage of the higher handling and transport costs commensurately entailed.

SUMMARY OF THE INVENTION

The object of the invention is to provide a frame construction which avoids the aforesaid drawbacks encountered with prior art frame constructions and which simplifies storage, shortens delivery times and which can be adapted more readily to prevailing conditions on the building site. This object is achieved in accordance with the invention by means of a frame construction of the aforesaid kind which is essentially characterized in that it comprises a plurality of mutually interconnected frame components, namely at least one frame side-piece for each frame side and a corner piece for each frame corner; in that partition walls are provided for dividing the interior of the frame construction into sections essentially at right angles to the frame side-pieces in the case of frame sides which comprise more than one frame side-piece; in that the partition walls are mutually of the same length as those frame side-pieces which extend parallel with respective partition walls; and in that a connector device is provided for connecting together mutually adjacent and/or mutually intersecting partition walls.

BRIEF DESCRIPTION OF THE DRAWINGS

The invention will now be described in more detail with reference to the accompanying drawings, in which

FIGS. 4a and 4b are respectively a side view and a front view of a partition wall incorporated in the frame construction according to FIG. 1; and FIG. 5 is a front view of a connector means incorporated in the frame construction shown in FIG. 1.

DETAILED DESCRIPTION

Figure 1:
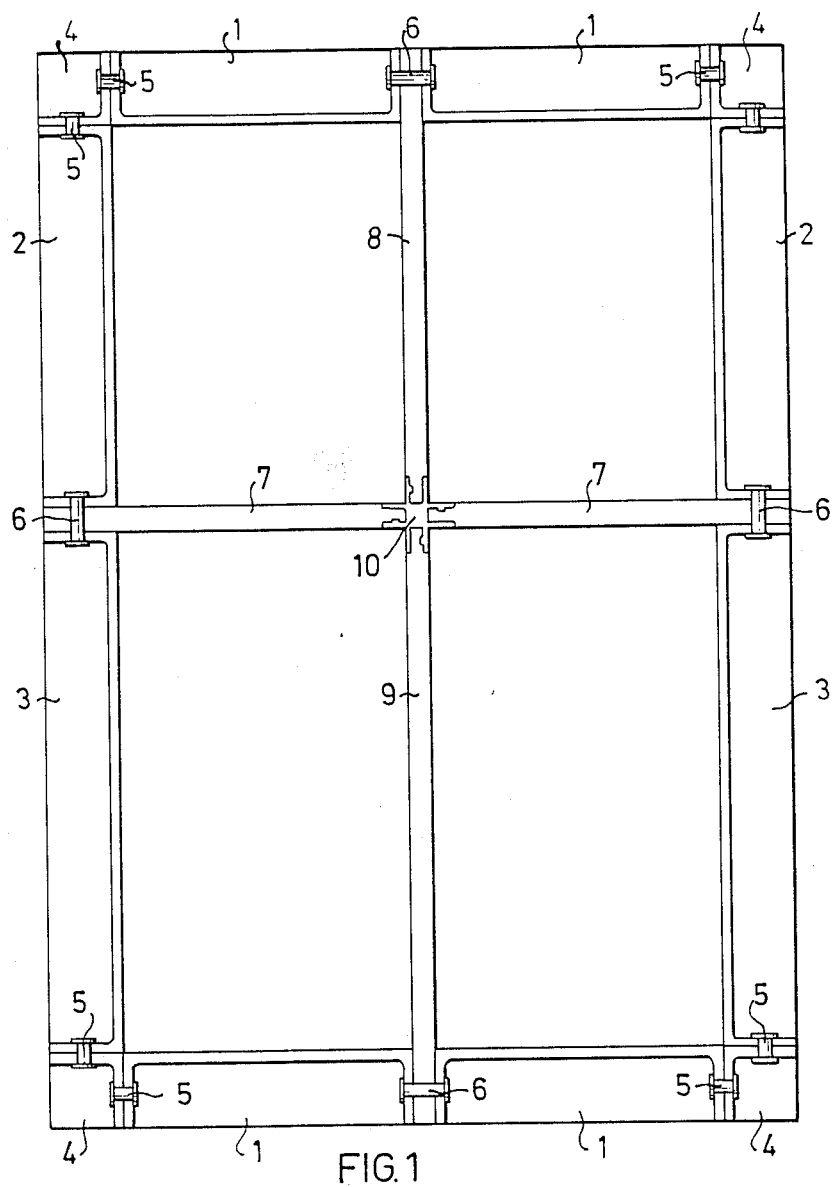
FIG. 1 is a front view of one embodiment of a frame construction according to the invention.

FIG. 1 illustrates a preferred embodiment of a frame construction according to the invention. The illustrated frame construction comprises a plurality of interconnected frame members, namely frame side-pieces 1, 2 and 3, and corner pieces 4. Mutually adjacent frame members are joined together by means of fastening devices 5, 6. Each side of the illustrated frame construction comprises two side-pieces 1, 2, 3 which have mounted therebetween a respective partition wall 7, 8 and 9. The partition walls 7-9 divide the space within the frame construction into sections, and the ends of the partition walls remote from the frame side-pieces 1-3 are connected to a connector device 10.

The frame construction shown in FIG. 1 merely illustrates the principle according to which the inventive frame construction is achieved, and it will be understood that frame constructions that comprise a desired number of sections to suit mutually different purposes can be achieved by varying the number of side-pieces 1-3 and partition walls 7-9 used. Each section of the frame construction is intended to be filled with packing pieces made of a material having a given compressibility, such as to present in said sections a plurality of through-passing holes which correspond in size and number to the size and number of cables or like devices to be passed through said sections or said frame construction. Since these components form no part of the present invention, they have not been shown in the drawing. The frame side-pieces 1-3 incorporated in the inventive frame construction differ from one another only with regard to their respective lengths, which also applies to the illustrated partition walls 7-9. It will be understood, however, that partition walls of a different configuration to that shown may be required in the case of frame constructions in which one frame side comprises solely a single frame side-piece or comprises more than two side-pieces. This will be described in more detail hereinafter.

Figure 2A:
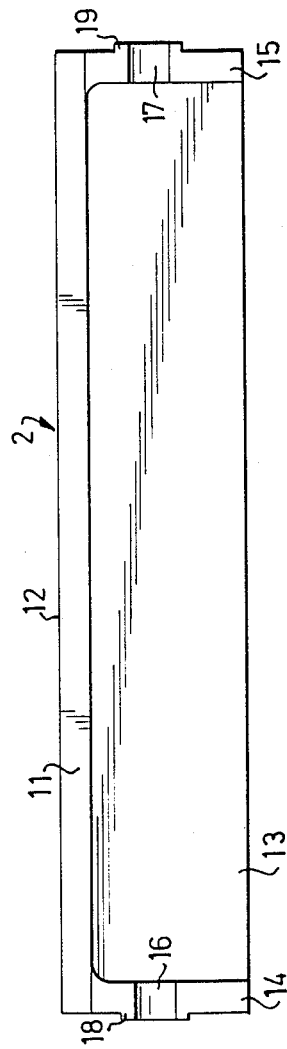
FIGS. 2a and 2b are respectively a front view and a side view of a frame side-piece incorporated in the frame construction of FIG. 1.
Figure 2B:
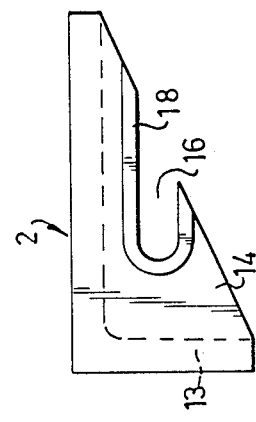

As beforementioned, the frame side-pieces 1-3 are identical with one another with the exception of their respective lengths. FIGS. 2a and 2b illustrate a particular frame side-piece 2, although it will be understood that the following description of this frame side-piece also applies to the remaining frame side-pieces 1 and 2. As illustrated in FIGS. 2a and 2b, the frame side-piece 2 includes a flat piece 11, having a surface 12 which when the frame construction is mounted in position faces the interior of the frame construction and forms a support for the packing pieces placed in the frame. A stiffening flange 13 extends outwardly from one longitudinal edge of the plate 11 away from the support surface 12. The short sides of the plate 11 have provided thereon end flanges 14 and 15 which extend out from the plate 11 in the same direction as the stiffening flange 13. The end flanges 14 and 15 are connected to the stiffening flange 13 and have a height of depth which corresponds to the height or depth of the stiffening flange 13 in the region where the end flanges adjoin the stiffening flange, and which decrease in depth in a direction towards the other long side of the plate 11, as illustrated in FIG. 2b.

The end flanges 14 and 15 are provided with recesses 16 and 17 respectively, which are substantially parallel with the plate 11 and are open in a direction away from the stiffening flange 13. The recesses 16 and 17 are intended to accommodate respective connecting devices 5 and 6. In order to enable the frame side-piece 2 to be aligned more precisely with an adjacent corner piece 4 or partition wall 7-9, each end flange 14, 15 is provided on its outwardly directed surface around respective recesses 16 and 17 with a projection 18 and 19, which has the form of a shoulder or strip and which is intended for engagement with a corresponding recess or channel in an adjacent corner piece 4 or partition wall 7-9 as described in more detail hereinafter.

Figure 3A:
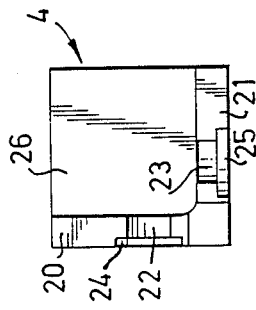
FIGS. 3a and 3b are respectively a side view and a front view of a corner piece incorporated in the frame construction according to the invention.
Figure 3B:
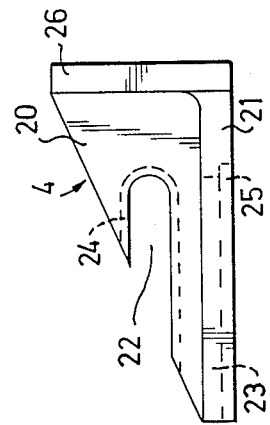

FIGS. 3a and 3b illustrate a corner piece 4, which is constructed to fit frame side-pieces 1-3 having the configuration illustrated in FIGS. 2a and 2b. Accordingly, the corner piece 4 includes two mutually identical flanges 20 and 21 which extend at right angles to one another and which have the same configuration as the end flanges 14 and 15 on the frame side-piece 2 illustrated in FIGS. 2a and 2b. The flanges 20 and 21 on the corner piece 4 are also provided with recesses 22 and 23 respectively of the same configuration as the recesses 16, 17 in respective end flanges 14 and 15 of the frame side-piece 2. The flanges 20 and 21, however, are not provided with projections around the recesses 22, 23. Instead there are provided around the recesses 22, 23 on the outer surfaces of the flanges 20, 21, recesses 24 and 25 which are so formed as to be capable of accommodating, with a small clearance, the projections 18 and 19 on a frame side-piece according to FIGS. 2a and 2b. The flanges 20 and 21 are connected at their high edges by means of a stiffening flange 26, which imparts the requisite rigidity to the corner piece 4.

FIGS. 4a and 4b illustrate the partition wall 8 in more detail. It will be understood, however, that the other partition walls 7 and 9 have the same configuration as the partition wall 8, and differ from said partition wall solely with regard to their respective lengths. As will be seen from FIG. 4a in particular, the upper end of the partition wall 8, as seen in the drawing, which is intended to be mounted between two frame side-pieces 1 of the frame construction illustrated in FIG. 1, is formed in a manner which corresponds to the flanges 20 and 21 of the corner piece 4 illustrated in FIGS. 3a and 3b. Thus, the partition wall 8 is provided with a recess 27 for a connecting device 6 although, as distinct from the flanges 20, 21 on the corner piece 4, the partition wall 8 is provided with a recess 28 and 29 on respective sides. The recesses 28, 29 are therewith so formed as to fit or accommodate respective projections 18 and 19 on a frame side-piece 1-3 in accordance with FIGS. 2a and 2b.

The partition wall 8 illustrated in FIGS. 4a and 4b is provided on its opposite end with a projection 30 for connecting the partition wall to the connector device 10. The projection 30 is slightly thinner than the partition wall 8 and is also provided with a groove 31 which extends along the whole length of the projection 30 and the function of which will be described in more detail hereinafter.

It is also conceivable for a partition wall to extend along the whole of the extension between two frame sides when the distance therebetween corresponds to the length of a frame side-piece 1-3. Although not shown in the drawing, the two ends of the partition wall in this case have the same configuration as the upper end of the partition wall 8 illustrated in the drawing. It is also conceivable for a partition wall to extend between two connector devices 10, when the frame construction comprises frame sides which include more than two frame side-pieces 1-3.

Although no such partition wall is illustrated in the drawing, it will be understood that both ends of such a partition wall will have the same configuration as the lower end of the partition wall 8 illustrated in the drawing.

FIG. 5 is a detailed end view of the connector device 10. The connector device 10 comprises a rail which has a cruciform cross-sectional configuration with the arms 32 of the cruciform being of equal length and extending at right angles to one another. Each of the arms 32 is provided with a groove 33 which is open towards the free end of its respective arm. Each groove 33 has a configuration which corresponds to the configuration of the projection 30 at one end of the partition wall 7-9 to be connected to the connector device 10. Accordingly, each groove 33 is provided on one side wall thereof with a strip or shoulder 34 having a shape and orientation which corresponds to the groove 31 in the projection 30 of the partition wall. Consequently, subsequent to being mounted in position relative to the connector device 10, the respective partition walls 7-9 will be held rigidly in relation to said means.

The components of the aforedescribed frame constructions, particularly the frame side-pieces 1-3, the corner pieces 4 and the partition wall 7-9, are constructed in a manner which enables them to be produced advantageously from a reinforced plastics material. The frame members may, for example, be manufactured from a pre-impregnated reinforcing net-like material, so-called SMC-plastic (Sheet Moulding Compound). The plastic material used shall be resistant against, for example concrete, and shall be capable of adhering firmly thereto, since in the majority of cases the frame construction will need to be cemented into concrete walls. Furthermore, the material shall be resistant to aggressive substances present in the environment in which the frame construction is used, and the material should not produce aggressive gases when subjected to the effect of fire. Furthermore, the material used shall be capable of withstanding variations in temperature between $-40°$ C and $+110°$ C. A material which fulfills these requirements is retailed under the designation ASEA SMC 55508.

The frame construction according to the invention affords many advantages over previously known steel frame constructions. For example, the inventive frame construction can be stored more readily and transported at lower costs than the prior art frame construction, since the inventive frame construction is not assembled until it reaches its place of use. By manufacturing the frame components from a plastics material, the added advantage is gained that the low thermal conductivity of the plastic counteracts carbonization of the sealing material, therewith providing a more effective fire guard than the prior art steel constructions.

It will be understood that the described and illustrated embodiment is not restrictive of the invention, but that modifications can be made within the scope of the following claims.

We claim:

1. A rectangular frame construction for providing leadthrough facilities for passing cables and like devices sealingly through a wall or like structure, said frame construction comprising:

a first pair of frame sides including a left frame side and a right frame side, each having two opposite ends;

a second pair of frame sides including a top frame side and a bottom frame side, each having two opposite ends;

both said frame sides of at least one of said pairs each comprising at least two frame side-pieces arranged in a respective line so as to have the respective said opposite ends on different ones of the respective said frame side-pieces in a respective said line, so that each of said frame side-pieces which comprises a respective side frame comprising at least two frame side-pieces has at least one frame side-piece end which lies intermediate the respective said frame side;

both said frame sides of at least another of said pairs each comprising at least one frame side piece;

at least one partition wall means arranged orthogonally of said frame construction so as to extend perpendicular to and between the frame sides of one of said pairs of frame sides each comprising at least two frame side-pieces and so as to extend parallel to and between the frame sides of another of said pairs of frame sides each comprising at least one frame side-pieces;

each partition wall means having two opposite end portions, each intervened between two respectively adjacent side piece ends which lie intermediate opposite ends of a respective frame side;

respective opposite ends of said frame sides of said first pair being arranged to adjoin respective opposite ends of said frame sides of said second pair at four respective corners;

four corner pieces disposed, respectively, at said four corners;

a plurality of first fastening devices each fastening a respective two adjoining ends of a respective two frame sides, to a respective said corner piece;

a plurality of second fastening devices each fastening a respective two adjacent side-piece ends which lie intermediate opposite ends of a respective frame side, to a respective end, which intervenes between them, of a respective said partition wall means, whereby said frame sides and said partition wall means constitute mutually interconnected frame members which divide said frame constructions, interiorly thereof, into a plurality of sections each adapted to be filled, in use, with a respective packing piece made from a material having a given compressibility, such as to provide a plurality of through-passing holes which correspond in size and numbers to cables or like devices which are to be passed through said frame construction.

2. A frame construction according to claim 1, wherein:

each frame side-piece comprises a plate having a surface which faces the interior of the frame construction and which is provided at each end thereof with a flange which extends outwardly substantially at right angles to the plate and which is provided with a through-passign hole means;

each corner piece being provided with two substantially mutually perpendicular flanges provided with through-passing hole means;

each partition wall comprising a plate which is provided at each end thereof, for connection with a respective frame side, with a through-passing hole means; and said first and second fastening devices being inserted through the respective said hole means in mutually abutting ones of said flanges on mutually adjacent ones of said frame members, and clamping together respective ones of said frame members.

3. A frame construction according to claim 2, wherein:

at least some of said frame members adjacent the respective said hole means are provided with complementary recesses and projections which fit into one another so as to achieve, together with said fastening devices, mutual alignment of the frame members.

4. A frame construction according to claim 3, wherein:

each frame side-piece adjacent each said hole means thereof has a said projection which extends around the respective said hole means; and each corner piece and each partition wall adjacent each hole means thereof has provided around the respective said hole means a respective said recess which accommodates the respective said projection.

5. A frame construction according to claim 2, wherein:

each said connector device comprises a rail of cruciform cross-sectional shape, having four mutually identical arms which extend at right angles to one another each having an outer, free end and each said arm being provided with a groove which is open towards the free end of the respective said arm and has a given configuration; and each partition wall, for connection to the respective said connector device being provided on the end thereof facing the respective said connector device with a projection having a configuration which corresponds to said configuration of the respective said groove in the respective said arm of the respective said connector device.

6. A frame construction according to claim 5, wherein:

each arm of each said connector device has a thickness corresponding to the thickness of the respective said partition wall, such that side surfaces of the arms of each connector device lie flush with the side surfaces of the respective said partition walls.

7. A frame construction according to claim 5, wherein:

the grooves in the arms of each said connector device are provided with means which, in co-action with correspondingly shaped means provided on the projections of the partition walls, prevent the respective projections from being inserted into the respective grooves and from being withdrawn therefrom in a longitudinal direction relative to the respective partition walls.

8. A frame construction according to claim 1, wherein:

said frame sides and said partition wall means are made from a pre-impregnated meshwork-reinforced plastics material.

9. The rectangular frame construction of claim 1, wherein:

at least one said partition wall means comprises at least two partition walls arranged in a respective line so as to have said opposite ends thereof on different ones of the respective said partition walls in a respective said line, so that each of said partition walls which comprises a respective partition wall means comprising at least two partition walls has at least one partition wall end which lies intermediate the respective said partition wall means, said at least one partition wall ends on adjoining ones of said partition walls in at least one respective said line being interconnected by a respective at least one connector device.

10. The rectangular frame construction of claim 9, wherein:

the frame sides of said other of said pairs of frame sides comprises at least two frame side-pieces; and further comprising:

at least one further partition wall means arranged orthogonally of said frame construction so as to extend perpendicular to and to intersect respective of the first-described partition wall means and to be connected thereto by said respective at least one connector device;

each further partition wall means having two opposite end portions, each intervened between two respectively adjacent side-piece ends which lie intermediate opposite ends of a respective frame side of said other of said pairs of frame sides.

* * * * *